United States Patent
Lin

(10) Patent No.: US 9,647,539 B1
(45) Date of Patent: May 9, 2017

(54) CHARGE PUMP BASED ON A CLOCK GENERATOR INTEGRATED CHIP

(71) Applicant: eGalax_eMPIA Technology Inc., Taipei (TW)

(72) Inventor: Po-Chuan Lin, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/180,849

(22) Filed: Jun. 13, 2016

(30) Foreign Application Priority Data

Dec. 9, 2015 (TW) .............................. 104141341 A

(51) Int. Cl.
G05F 1/10 (2006.01)
G05F 3/02 (2006.01)
H02M 3/07 (2006.01)
H01L 27/088 (2006.01)
G06F 3/041 (2006.01)

(52) U.S. Cl.
CPC .............. *H02M 3/07* (2013.01); *G06F 3/041* (2013.01); *H01L 27/088* (2013.01)

(58) Field of Classification Search
USPC .................................................. 327/535, 536
See application file for complete search history.

(56) References Cited

U.S. PATENT DOCUMENTS

| | | | |
|---|---|---|---|
| 8,811,920 B2* | 8/2014 | Deuchars | H03F 1/0227 257/299 |
| 2011/0227633 A1* | 9/2011 | Mo | H02M 3/07 327/517 |
| 2013/0328824 A1* | 12/2013 | Krah | G06F 3/041 345/174 |
| 2014/0333368 A1* | 11/2014 | Bell | H03K 17/955 327/517 |
| 2015/0188419 A1* | 7/2015 | Lin | H02M 3/073 327/536 |
| 2015/0188420 A1* | 7/2015 | Lin | H02M 3/073 327/536 |

* cited by examiner

*Primary Examiner* — Adam Houston
(74) *Attorney, Agent, or Firm* — Muncy, Geissler, Olds & Lowe, P.C.

(57) ABSTRACT

A charge pump includes chip, package substrate and circuit board. Chip includes transistor set including at least four transistors connected to first input end of input terminal set and two rows of odd number and even number second input ends of input terminal set. Except first transistor, the other transistors are arranged in two rows subject to odd number and even number and respectively electrically coupled to the two rows of at least three second input ends by traces. At least three second external pins of package substrate and at least three capacitors of circuit board are respectively arranged in two rows subject to odd number and even number, enabling first circuit with connected odd number second external pins and second circuit with connected even number second external pin to be kept apart without intersection. Traces in chip are arranged in staggered manner, reducing parasitic capacitance.

7 Claims, 4 Drawing Sheets

CHARGE PUMP BASED ON A CLOCK GENERATOR INTEGRATED CHIP

BACKGROUND OF THE INVENTION

This application claims the priority benefit of Taiwan patent application number 104141341, filed on Dec. 9, 2015.

1. Field of the Invention

The present invention relates to charge pump technology, and more particularly, to a charge pump based on a clock generator integrated chip for use in a touch panel, which has a transistor set of a chip thereof electrically coupled to a first input end and at least three second input ends that are arranged in two rows subject to odd number and even number, and then coupled to a package substrate and a circuit board in a similar arrangement and also electrically coupled to a clock generator, enabling the traces in the chip to be arranged in a staggered manner with the first circuit and second circuit of the circuit board spaced apart without intersection, minimizing generation of parasitic capacitance.

2. Description of the Related Art

A touch panel can be joined with a display screen to create a touchscreen for use in a notebook computer, tablet computer, smart phone or any other electronic device as an input interface for sensing any touch input in the display zone. The sensing circuit of a touch panel has a charge pump circuit incorporated therein and configured to amplify input voltage for generating a high level output voltage to enhance the anti-noise capability of the touch panel.

FIG. 4 is a circuit diagram of a charge pump according to the prior art. This design of charge pump comprises a chip X, a package substrate Y and a circuit board Z. The chip X is mounted on the package substrate Y. The package substrate Y is mounted on the circuit board Z. The chip X comprises a transistor set X1, and a clock generator X2 disposed at one lateral side relative to the transistor set X1. The transistor set X1 consists of seven transistors. Further, the chip X has nine connection ends X3 respectively disposed to face toward the clock generator X2 and the transistors of the transistor set X1. Two of the nine connection ends X3 are respectively electrically coupled to the clock generator X2. The other connection ends X3 are respectively electrically coupled to the transistors of the transistor set X1. The package substrate Y comprises a plurality of pins Y1 respectively electrically coupled to the pins at the connection ends X3. The circuit board Z comprises a first circuit Z1, a second circuit Z2, six capacitors Z3, and a logic high/low power supply Vdd. The logic high/low power supply Vdd is electrically coupled to the connection end X3 that is electrically coupled to the first transistor of the transistor set X1. The first circuit Z1 and the second circuit Z2 have the respective one ends thereof respectively electrically coupled to the two connection ends X3 that are electrically coupled to the clock generator X2, and the respective opposite ends thereof shunted and electrically coupled to the capacitors Z3 and then the connection ends X3 of the other transistors of the transistor set X1 excluding the first transistor. Because the clock generator X2 provides a pulse signal CK and a negative pulse signal CKB through the two connection ends X3 and because the transistors that receive the pulse signal and the negative pulse signal must arranged in rows and spaced from one another, points of intersection Z4 are created after shunting of the first circuit Z1 and the second circuit Z2.

Due to creation of the points of intersection Z4 after shunting of the first circuit Z1 and the second circuit Z2, the circuit board Z needs to provide an extra layer for the arrangement of traces, increasing the number of layers and complexity of the structure of the circuit board Z and resulting in increased circuit board cost. Further, the arrangement of long and large area traces in the circuit board brings relatively larger parasitic capacitance, lowering the charge pump operating efficiency and resulting in negative pulse signal interference.

Therefore, it is desirable to provide a charge pump that eliminates the drawbacks of the aforesaid prior art design.

SUMMARY OF THE INVENTION

The present invention has been accomplished under the circumstances in view. It is therefore the main object of the present invention to provide a charge pump, which comprises a chip, a package substrate and a circuit board, wherein the transistor set of the chip comprises at least four transistors respectively coupled to a first input end and two rows of odd number and even number second input ends of an input terminal set of the chip; except the first transistor, the other transistors are sorted in separated odd number and even number transistors and respectively electrically coupled to the two rows of at least three second input ends by traces; the at least three second external pins of the package substrate and the at least three capacitors of the circuit board are arranged in two rows subject to odd number and even number; the odd number second external pins are coupled to the first circuit and the even number second external pin is coupled to the second circuit; traces in the chip are arranged in a staggered manner so that the distance and area of the first circuit, the second circuit and the multiple traces can be reduced, minimizing parasitic capacitance and further improving charge pump operating efficiency and avoiding negative pulse signal interference.

According to another aspect of the present invention, the clock generator of the chip is disposed at one lateral side relative to the transistor set; the first clock pin of the package substrate is disposed adjacent to the odd number second external pins of the package substrate; the second clock pins and the even number second external pins are respectively disposed at two opposite sides relative to the first clock pin and the odd number second external pin, and thus, the second circuit of the circuit board can be located at an outer side relative to the first circuit without being intersected. Because the at least three second external pins can be disposed adjacent to the first clock pin and the second clock pin, the distance and area between the first circuit and the second circuit can be greatly reduced, minimizing parasitic capacitance.

According to another aspect of the present invention, the clock generator of the chip is located at the center below the transistor set to have the first clock pin of the package substrate be disposed adjacent to the odd number second external pins and the second clock pin be disposed adjacent to the even number second external pin so that the first circuit and second circuit of the circuit board are disposed at two opposite sides without being intersected. Because the second circuit needs not to be extended around the first circuit, the wiring distance and area of the first circuit and the second circuit can be reduced, minimizing parasitic capacitance.

DETAILED DESCRIPTION OF THE
PREFERRED EMBODIMENT

Figure 1:
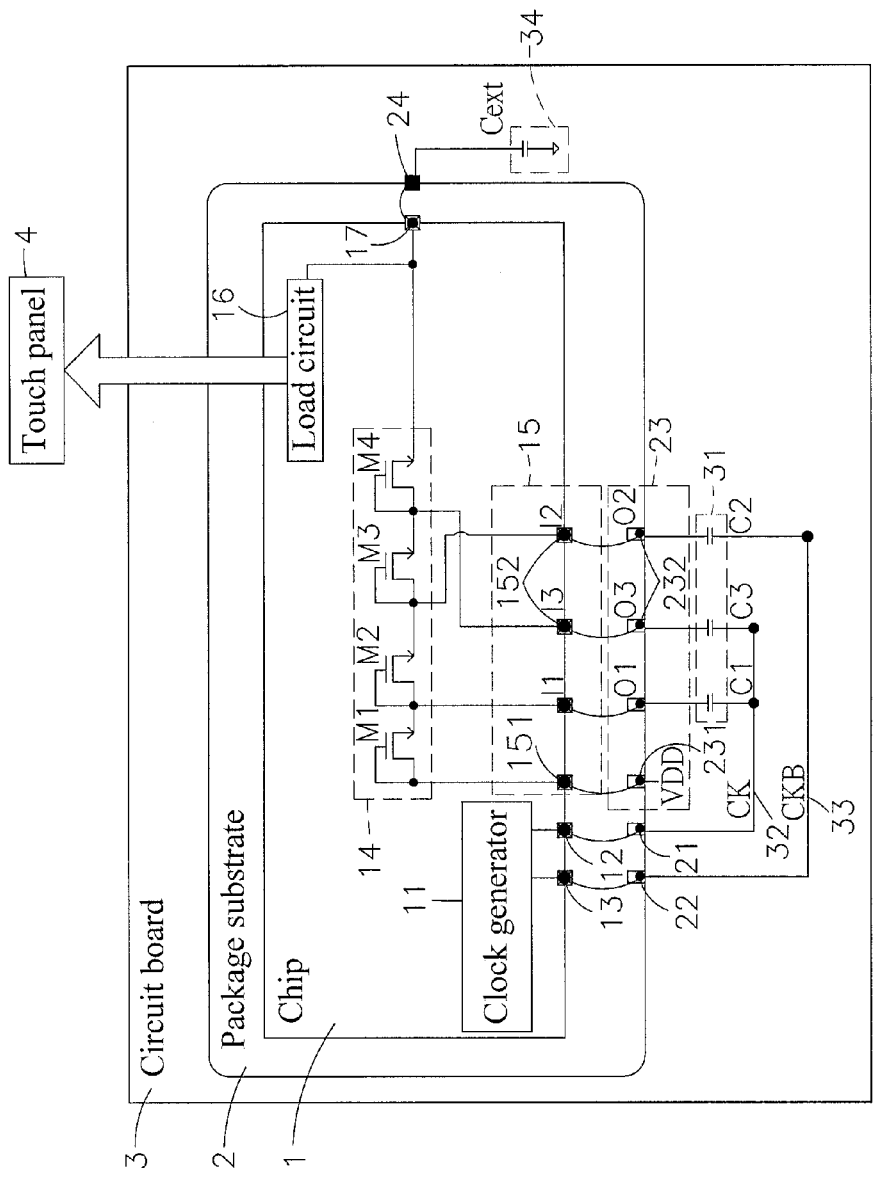
FIG. 1 is a circuit diagram of a charge pump in accordance with the present invention.

Referring to FIG. 1, a charge pump in accordance with the present invention is shown. The charge pump comprises a chip 1, a package substrate 2 and a circuit board 3.

The chip 1 comprises a clock generator 11, a first clock terminal 12 and a second clock terminal 13 respectively and electrically coupled to the clock generator 11, a transistor set 14, an input terminal set 15, a load circuit 16 and an output terminal 17. The clock generator 11 of the chip 1 is electrically coupled with the first clock terminal 12 and the second clock terminal 13 and adapted for generating and outputting a pulse signal CK through the first clock terminal 12 and a negative pulse signal CKB through the second clock terminal 13. The transistor set 14 comprises, for example, but not limited to, four transistors (M1~M4). The drains of the transistors (M1~M4) are respectively electrically connected to the respective gates. Further, the connection points between the drains and gates of the transistors (M1~M4) are respectively and electrically connected to first input end 151 and at least three second input ends 152 (I1~I3) of the input terminal set 15. These at least three second input ends 152 (I1~I3) are arranged in two rows by even or odd numbers (i.e., I1 and I3 in one row, I2 in the other row). The second input end 152 of odd number is disposed adjacent to the first clock terminal 12. The second input ends 152 of even number are disposed remote from the first clock terminal 12. The first transistor (M1) is electrically connected to the first input end 151 by a straightly extended trace 18. The other transistors (M2~M4) are respectively electrically connected to the at least three second input ends 152 (I1~I3) by the respective traces 18. Thus, the traces 18 are arranged in a staggered by means of the multiple metal layers of the chip 1; the transistors M1~M4 are electrically coupled to one another by: respectively electrically connecting the sources of the transistors M1~M3 to the connection points between the drains and gates of the adjacent transistors M2~M4, and then electrically connecting the source of the last transistor (M4) to the load circuit 16 and the output terminal 17. The load circuit 16 is electrically connected to a touch panel 4. The load circuit 16 can be a driver for providing a trigger signal to the touch panel 4.

The package substrate 2 comprises a first clock pin 21, a second clock pin 22, an external pin set 23, and a power output pin 24. The external pin set 23 comprises a $1^{st}$ external pin O1, a $2^{nd}$ external pin O2, a $3^{rd}$ external pin O3, a $4^{th}$ external pin O4, a $5^{th}$ external pin O5, a $6^{th}$ external pin O6, a $7^{th}$ external pin O7, an $8^{th}$ external pin O8, and a $9^{th}$ external pin O9.

The package substrate 2 comprises the first clock pin 21, the second clock pin 22, the external pin set 23 and the transmission pin 24. The chip 1 is mounted on the package substrate 2 with the first clock terminal 12 and the second clock terminal 13 respectively electrically coupled to the first clock pin 21 and second clock pin 22 of the package substrate 2. The external pin set 23 comprises a first external pin 231, and at least three second external pins 232 (O1-O3) arranged at one lateral side relative to the first external pin 231. The at least three second external pins 232 (O1-O3) are arranged in two rows subject to odd number and even number (O1 and O3 in one row, O2 in the other). The first input end 151 of the chip 1 is electrically coupled to the first external pin 231. The at least three second input ends 152 (I1~I3) of the chip 1 are respectively electrically coupled to the second external pins 232 (O1-O3). The transmission pin 24 is electrically coupled to the output terminal 17.

The circuit board 3 carries the package substrate 2, comprising a capacitor set 31. The capacitor set 31 consists of at least three capacitors (C1-C3) that are arranged in two rows subject to odd number and even number (C1 and C3 in one row, C2 in the other). Further, the first external pin 231 of the package substrate 2 is electrically coupled to a logic high/low power supply Vdd of the circuit board 3. The two rows of the at least three second external pins 232 (O1-O3) are respectively electrically coupled to the two rows of the at least three capacitor (C1-C3) through a first circuit 32 and a second circuit 33. The odd number capacitors (C1,C3) are electrically coupled to the first clock pin 21 of the package substrate 2 by the first circuit 32. The even number capacitor (C2) is electrically coupled to the second clock pin 22 of the package substrate 2 by the second circuit 33. The circuit board 3 comprises a storage circuit 34 electrically coupled to the transmission pin 24. The storage circuit 34 comprises an external capacitor Cext that has its one end electrically coupled to the transmission pin 24 and its other end grounded.

Further, the clock generator 11 of the chip 1 can be configured to provide a pulse signal to the first clock terminal 12 and a negative pulse signal to the second clock terminal 13. Alternatively, subject to actual design requirements, the clock generator 11 can also be configured to provide a negative pulse signal to the first clock terminal 12 and a pulse signal to the second clock terminal 13.

The invention utilizes the originally exited multiple metal layers of the chip 1 to have the traces 18 be arranged in a staggered manner, enabling the odd number and even numbers transistors (M2~M4) except the first transistor to respectively electrically coupled to the two rows of the at least three second input ends 152 (I1~I3) by the traces 18 that are arranged in a staggered manner by means of the multiple metal layers of the chip 1. The at least three second input ends 152 (I1~I3) and the at least three second external pin 232 (O1-O3) are respectively arranged in two rows subject to odd number and even number, allowing connection therebetween by straight circuit lines. The two rows of the at least three second external pin 232 (O1-O3) are respectively electrically coupled to the first clock pin 21 of the package substrate 2 by the first circuit 32 and the second clock pins 22 of the package substrate 2 by the second circuit 33. In actual application, the odd number second external pins 232 are electrically coupled to the odd number capacitors and the first clock pin 21 by the first circuit 32, the even number second external pin 232 is electrically coupled to the even number capacitor and the second clock pin 22 by the second circuit 33. The odd number and even number component parts are arranged in two rows. Because the odd number component parts are disposed adjacent to the first clock pin 21 and the clock generator 11 is configured to provide a pulse signal and a negative pulse signal through the first clock terminal 12 and the second clock terminal 13 respectively, the first circuit 32 and second circuit 33 of the circuit board 3 can be spaced part without intersection; the staggered traces 18 are arranged in the chip 1. Subject to the formula of parasitic capacitance: $C=\in/d*W*L$, in which, W: conductor width (meter; m), L: conductor length (meter; m), d: distance (meter; m), $\in$: dielectric constant (farad/meter;

F/m), it can be known that the circuit board 3 has the characteristics of: conductor width W about 0.1~0.3 mm, conductor length L about several centimeters, dielectric constant ∈ about 4 F/m, distance d about 0.1 mm; the chip 1 has the characteristics of: conductor width W about 0.1 micrometer (μm), conductor length L about several hundred μm, dielectric constant ∈ about 1~5 F/m according to different manufacturing processes, distance d about several thousands of A (A: 10-10 m). Therefore, it is clear that, when compared with the prior art design the chip 1 has the multiple traces 18 arranged therein in a staggered manner, enabling the distance and area of the traces 18 as well as the distance and area of the first circuit 32 and the second circuit 33 of the circuit board 3 to be minimized, significantly reducing parasitic capacitance and improving charge pump operating efficiency, and also avoiding negative pulse signal interference.

Figure 2:
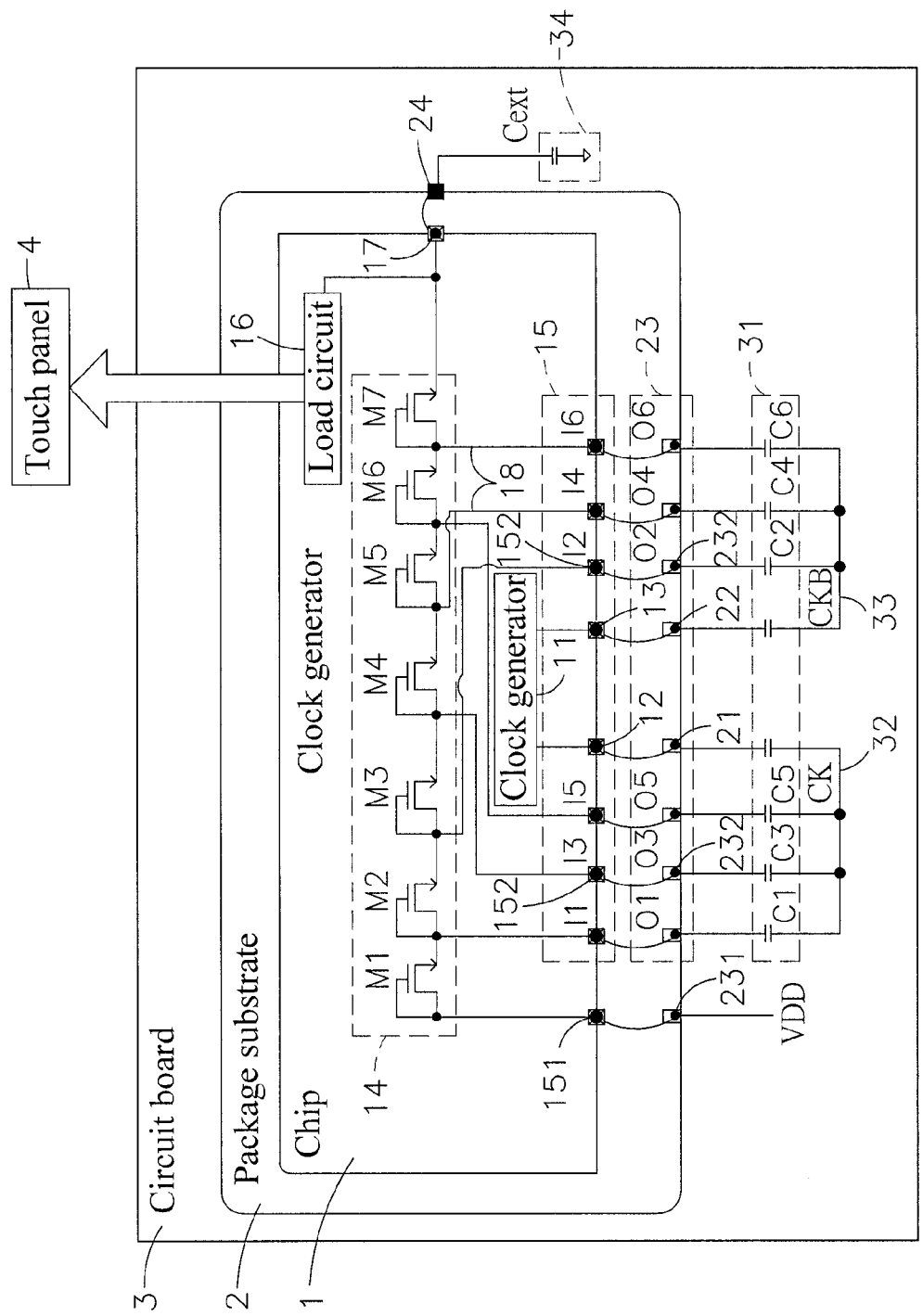
FIG. 2 is a circuit diagram of an alternate form of the charge pump in accordance with the present invention.
Figure 3:
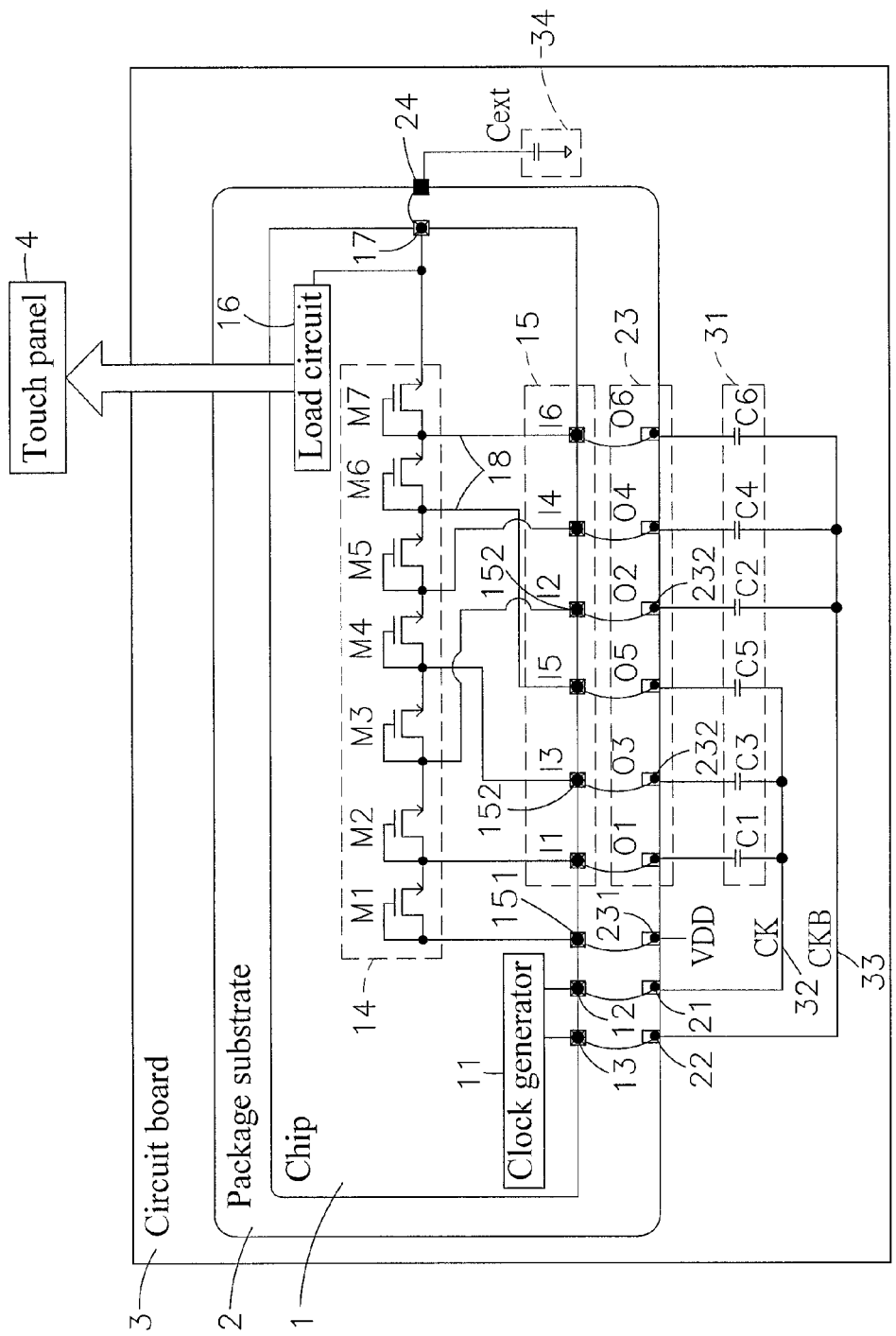
FIG. 3 is a circuit diagram of another alternate form of the charge pump in accordance with the present invention.
Figure 4:
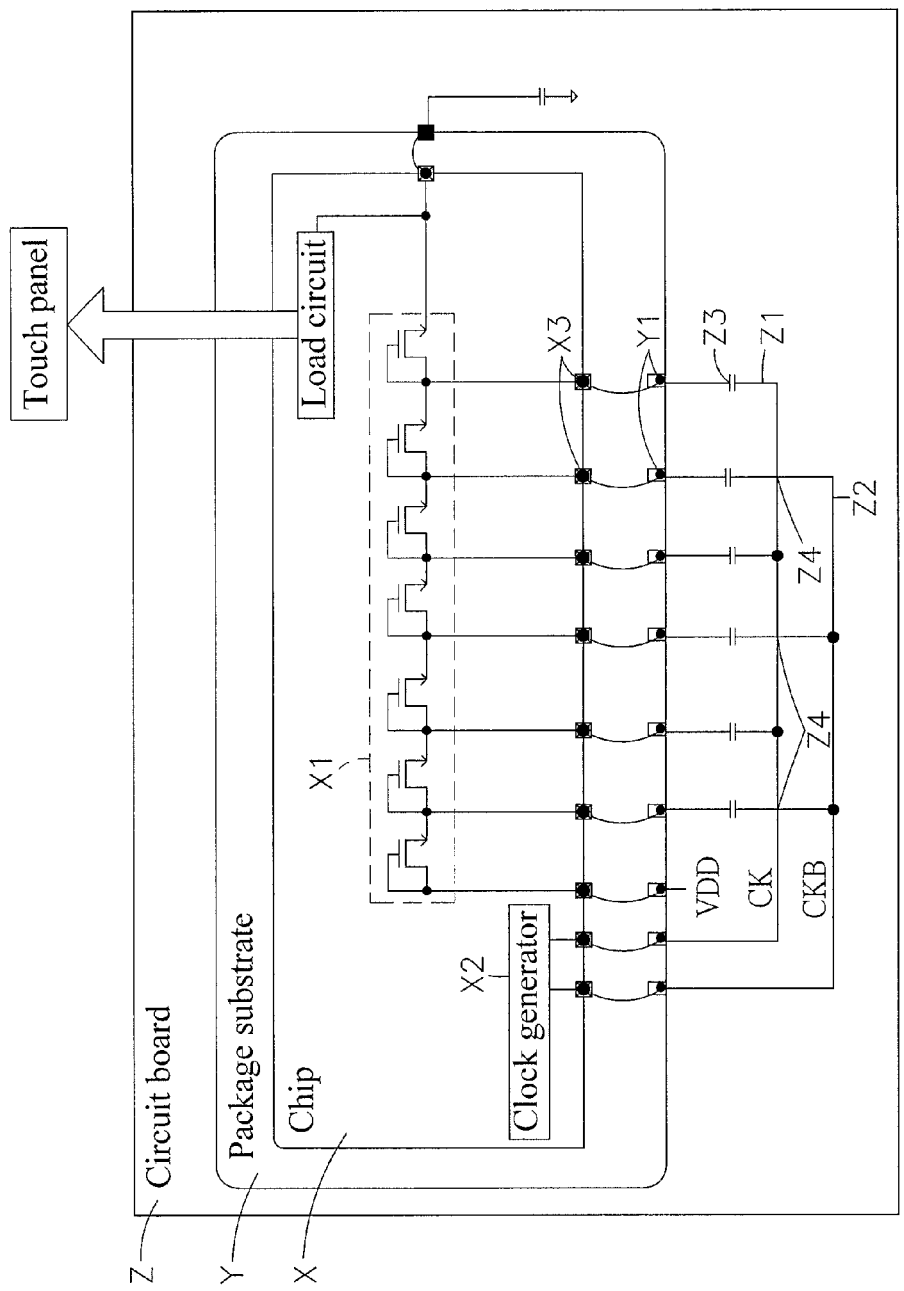
FIG. 4 is a circuit diagram of a charge pump according to the prior art.

Further, as illustrated in FIGS. 1-3, the clock generator 11 of the chip 1 can be disposed at one lateral side relative to the transistor set 14 so that the first clock pin 21 can be disposed adjacent to the odd number second external pins 232 with the second clock pins 22 and the even number second external pin 232 disposed at two opposite lateral sides, and thus, the second circuit 33 can be disposed at an outer side relative to the first circuit 32 with no intersection. Alternatively, the clock generator 11 can be located at the center below the transistor set 14 with the first clock pin 21 disposed adjacent to the odd number second external pin 232 and the second clock pins 22 disposed adjacent to the even number second external pin 232, and thus, the second circuit 33 can be disposed at an outer side relative to the first circuit 32 with no intersection. Because the second circuit 33 needs not to be extended around the first circuit 32, the wiring distance and area of the first circuit 32 and the second circuit 33 can be significantly reduced, minimizing parasitic capacitance and avoiding negative pulse signal interference. These equivalent forms should be included in claims without departing from the scope and spirit of the invention.

Further, as illustrated in FIGS. 1-3, as illustrated, the transistor set 14 of the chip 1 consists of the seven transistors (M1~M7). The connection points between the drains and gates of the transistors are respectively electrically coupled to the first input end 151 and the six second input ends 152 (I1~I6) of the input terminal set 15. The second input ends 152 (I1~I6) are arranged in two rows subject to odd number and even number (the odd number second input ends I1,I3 and I5 are disposed at one side, and the even number second input ends I2,I4 and I6 are disposed at an opposite side).

In conclusion, the invention provides a charge pump based on a clock generator integrated chip, which comprises a chip 1, a package substrate 2 and a circuit board 3; the chip 1 comprises a clock generator 11, a first clock terminal 12 and a second clock terminal 13 electrically coupled to the clock generator 11, a transistor set 14 consisting of at least four transistors, and an input terminal set 15 comprising a first input end 151 and at least three second input ends 152 respectively electrically connected to the at least four transistors by respective traces 18 that are arranged in a staggered manner; the package substrate 2 comprises a first clock pin 21 and a second clock pin 22 respectively electrically connected to the first clock terminal 12 and the second clock terminal 13 of the chip 1, and an external pin set 23 that comprises a first external pin 231 electrically coupled to the first input end 151 and at least three second external pins 232 arranged in two rows and respectively electrically connected to the at least three second input ends 152; the circuit board 3 comprises a logic high/low power supply Vdd electrically coupled to the first external pin 231, a first circuit 32 and a second circuit 33 respectively electrically connecting the two rows of the at least three second external pins 232 (O1-O3) to two rows of capacitors and then the first clock pin 21 and the second clock pin 22 of the package substrate 2, and thus, the traces 18 in the chip 1 can be arranged in a staggered manner, allowing the first circuit 32 and the second circuit 33 of the circuit board 3 to be spaced part without intersection so that the multiple traces 18 in the chip 1 can be minimized, greatly reducing the wiring distance and area of the first circuit 32 and the second circuit 33 of the circuit board 3 and the parasitic capacitance, and avoiding circuit interference.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A charge pump for use in a touch panel, comprising a chip, a package substrate and a circuit board, wherein:
    said chip comprises a clock generator, a first clock terminal and a second clock terminal respectively and electrically coupled to said clock generator, a transistor set, an input terminal set comprising a first input end and at least three second input ends, a load circuit and an output terminal, said transistor set comprising a first transistor and at least three second transistors respectively and electrically coupled to said first input end and said at least three second input ends of said input terminal set, said at least three second input ends being arranged into two rows subject to odd number and even number, each said second input end of odd number being disposed adjacent to said first clock terminal, each said second input end of even number being disposed remote from said first clock terminal, said first transistor of said transistor set being electrically coupled to said first input end by a straightly extended trace, said at least three second transistors being arranged into rows subject to odd number and even number and respectively electrically coupled to said at least three second input ends by respective traces, each two adjacent said second transistors being electrically coupled to one another with the last said second transistor electrically coupled to said load circuit, said load circuit being electrically coupled to a touch panel;
    said package substrate carries said package substrate, comprising a first clock pin, a second clock pin and an external pin set, said first clock pin and said second clock pin being respectively electrically coupled to said first clock terminal and said second clock terminal of said chip, said external pin set comprising a first external pin located at one side and at least three second external pins located at an opposite side, said at least three second external pins being arranged in two rows subject to odd number and even number, said first external pin being electrically coupled to said first input end of said chip, said at least three second external pins being respectively electrically coupled to said at least three second input ends of said chip;
    said circuit board carries said package substrate, comprising a capacitor set, a first circuit, a second circuit and a logic high/low power supply, said capacitor set comprising at least three capacitors arranged in two rows subject to odd number and even number, said logic high/low power supply being electrically coupled to said first external pin of said package substrate, said first circuit and said second circuit being adapted for electrically coupling the two rows of said at least three said second external pins to the two rows of said at least three capacitors, the odd number said capacitor being electrically coupled to said first clock pin of said package substrate by said first circuit, the even number said capacitors being electrically coupled to said second clock pin of said package substrate by said second circuit.

2. The charge pump as claimed in claim 1, wherein said clock generator of said chip is disposed at one side relative to said transistor set so that said first clock pin of said package substrate is disposed adjacent to the odd number said second external pins of said package substrate with said second clock pin and the even number said second external pins respectively disposed adjacent two opposite lateral sides thereof, said second circuit of said circuit board being disposed at an outer side relative to said first circuit in a non-staggered manner.

3. The charge pump as claimed in claim 1, wherein said clock generator of said chip is located on the center of a lower side relative to said transistor set so that said first clock pin of said package substrate is disposed adjacent to the odd number said second external pins and said second clock pin is disposed adjacent to the even number said second external pin with said first circuit and said second circuit of said circuit board respectively disposed at two opposite sides in a non-staggered manner.

4. The charge pump as claimed in claim 1, wherein the drains of said transistors are respectively electrically connected to the respective gates of the respective said transistors; the connection points between the drains and gates of said transistors are respectively and electrically connected to said first input end and said at least three second input ends of said input terminal set; the sources of said transistors are respectively electrically connecting to the connection points between the drains and gates of the adjacent said transistors with the source of the last said transistor electrically connected to said load circuit.

5. The charge pump as claimed in claim 1, wherein said clock generator of said chip is configured to provide a pulse signal to said first clock terminal and a negative pulse signal to said second clock terminal.

6. The charge pump as claimed in claim 1, wherein said clock generator of said chip is configured to provide a negative pulse signal to said first clock terminal and a pulse signal to said second clock terminal.

7. The charge pump as claimed in claim 1, wherein the last said transistor of said transistor set of said chip is electrically coupled to said output terminal; said package substrate further comprises a transmission pin electrically coupled to said output terminal; said circuit board further comprises a storage circuit electrically coupled to said transmission pin, said storage circuit comprising an external capacitor, external capacitor having one end thereof electrically coupled to said transmission pin and an opposite end thereof grounded.

* * * * *